United States Patent
Meyer et al.

(10) Patent No.: US 6,578,386 B2
(45) Date of Patent: Jun. 17, 2003

(54) PLUNGER MECHANISM FOR I.S. MACHINE

(75) Inventors: Willi Meyer, Effretikon (CH); Vladimir Vajda, Nussbaumen (CH)

(73) Assignee: Emhart Glass S.A., Cham (CH)

( * ) Notice: Subject to any disclaimer, the term of this patent is extended or adjusted under 35 U.S.C. 154(b) by 322 days.

(21) Appl. No.: 09/800,995

(22) Filed: Mar. 7, 2001

(65) Prior Publication Data

US 2002/0124599 A1 Sep. 12, 2002

(51) Int. Cl.⁷ .............................................. C03B 11/06
(52) U.S. Cl. ........................................... 65/362; 65/171
(58) Field of Search ....................... 65/171, 172, 173, 65/323, 362

(56) References Cited

U.S. PATENT DOCUMENTS

| | | | | |
|---|---|---|---|---|
| 4,272,273 A | * | 6/1981 | Trahan et al. | 65/167 |
| 5,332,413 A | * | 7/1994 | Trahan et al. | 65/319 |
| 5,718,740 A | * | 2/1998 | Mann | 65/171 |

* cited by examiner

*Primary Examiner*—Sean Vincent
(74) *Attorney, Agent, or Firm*—Spencer T. Smith

(57) ABSTRACT

A plunger mechanism which has a one piece housing into which is inserted the upper sealing member. The upper sealing member is secured to the interior wall of the housing at its desired location.

3 Claims, 2 Drawing Sheets

PLUNGER MECHANISM FOR I.S. MACHINE

BACKGROUND OF THE INVENTION

This invention relates to a plunger operating mechanism for operating a parison plunger in an I.S. type glassware forming machine.

In the production of glass containers by the press and blow method on the well known I.S. type machine, a gob of glass is provided to a parison mold which is then closed, and the glass is pressed into the required shape of a parison by a plunger moving upwardly into the mold, a lower portion of the glass being forced into a neck ring of the mold. The plunger is then withdrawn and the parison is carried by the neck ring away from the parison molding station and is transferred to a blow mold station where it is blown to the required shape. A typical plunger operating mechanism is shown in U.S. Pat. No. 4,272,273. This mechanism is pneumatically operated and comprises a lower cylinder member having a vertical cylindrical bore closed at its lower end by an integral base portion, in which bore is mounted a piston head on a piston rod. The upper, free, end of the piston rod supports a plunger. Secured in the base portion of the cylinder member is a rod guide in the form of a hollow tube, which serves to guide the piston rod and also to supply cooling air to the plunger mechanism. The upper end of the cylindrical bore is closed by a separate upper casing. Sandwiched between the lower cylinder and the upper casing is a cylinder sealing portion through which the piston rod passes. The upper casing, which receives a plunger guiding and positioning mechanism, is clamped to the lower cylinder with suitable fasteners. This construction, comprising the lower cylinder member and the upper casing secured to it, is expensive.

OBJECT OF THE INVENTION

It is accordingly an object of the present invention to provide a plunger operating mechanism, which is more economical.

Other objects and advantages of the present invention will become apparent from the following portion of this specification and from the accompanying drawings, which illustrate in accordance with the mandate of the patent statutes a presently preferred embodiment incorporating the principles of the invention.

BRIEF DESCRIPTION OF THE PREFERRED EMBODIMENT

Figure 1:
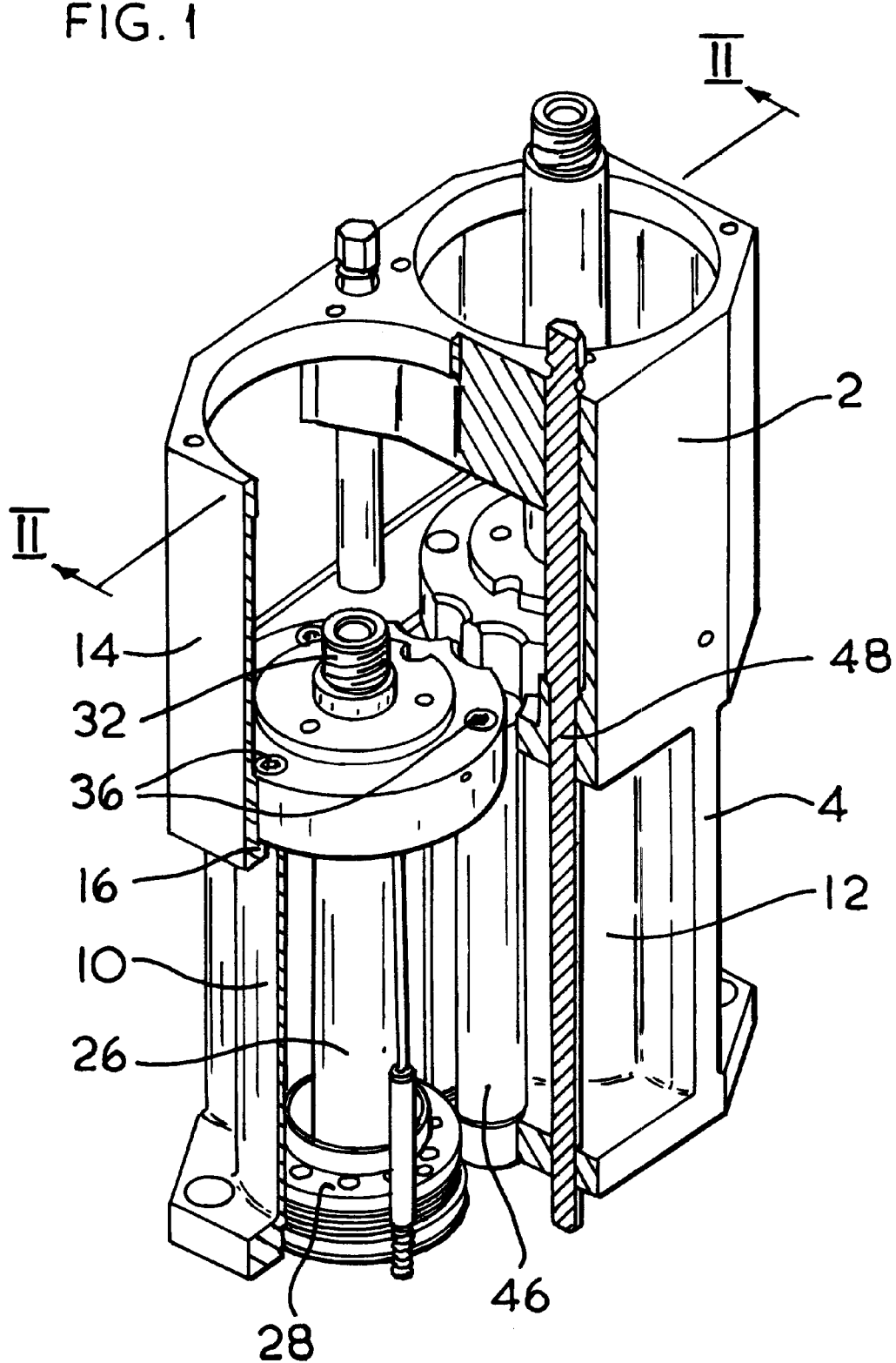
FIG. 1 shows a perspective view of a plunger mechanism with some parts broken away and other parts omitted.
Figure 2:
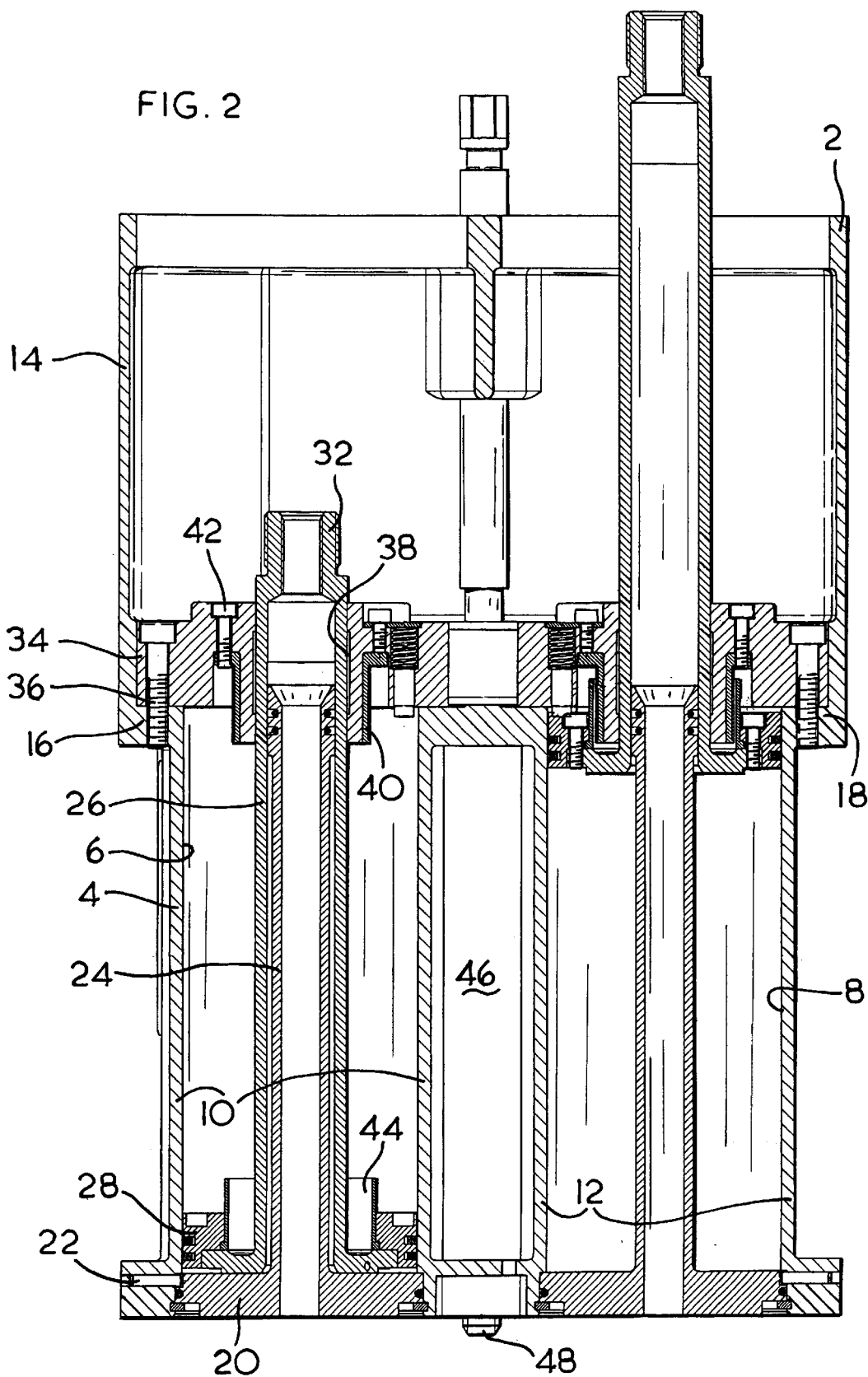
FIG. 2 show a view of a section along the line II—II of FIG. 1.

A pneumatically operated plunger mechanism for use in an I.S. glassware making machine is shown in the drawings. This mechanism is for operating two plungers in a double gob machine and resembles, in many respects, the mechanism described in U.S. Pat. No. 4,272,273 to which reference should be made for the description of parts not described herein. The plunger mechanism comprises a one piece housing 2 comprising a lower portion 4, comprising two vertical bores 6 and 8 provided in cylindrical bodies 10 and 12, respectively, and an upper portion 14 which is adapted to receive conventional plunger guiding and positioning mechanisms similar to that described in U.S. Pat. No. 4,272,273 with particular reference to FIG. 1 thereof. The two plungers of the mechanism are identically constructed and only the left hand mechanism shown in FIG. 2 and comprising the bore 6 and the body 10 will be described in detail. The housing 2 comprises shelf means at the location where the cylindrical bodies 10, 12 meet. This shelf means comprises a shelf 16, which extends around the upper end of the body 10 and a shelf 18, which extends around the upper end of the body 12.

The lower end of the bore 6 is sealed by a lower sealing member 20, which is secured in position by a pin 22. The member 20 comprises a rod guide in the form of an upwardly extending hollow tube 24 which reaches to just above the upper end of the bore 6. In the use of the mechanism, cooling air is provided through the tube 24. Slidably mounted on the tube 24 is a hollow piston rod 26 which is secured to a piston head 28, which is arranged to move axially in sealing engagement with the bore 6 (enlarged head 30 of the tube 24 is a close sliding fit in the piston rod 26). The piston rod 26 has an upper free end portion 32, which is adapted to support a plunger when the mechanism is in use. It will be seen that the head 30 of the tube 24 provides a guide for the piston rod 26 as the rod moves vertically from the position shown on the left in FIG. 2 to that shown on the right in FIG. 2.

An upper sealing member 34 is arranged adjacent the location where the body 10 and the upper portion 14 of the housing 2 meet to seal the upper end of the bore 6. The member 34 is generally circular and is configured so that it can be inserted into the top open end of the one piece housing and displaced downwardly until it abuts against (sits on) the shelf 16. It is then secured to the shelf 16 by fastening means in the form of screws 36. The sealing member 34 has a central aperture 38 through which the piston rod 26 slidably passes and which provides a bearing for the piston rod 26.

Reference should be made to the '273 Patent for additional conventional details omitted herein for clarity.

Air is supplied into the cylinder 6 above and below the piston head 8 through passageways, not shown, in the wall of the cylinder. A sensor sleeve 40 is secured to the sealing member 34 by screws 42. This sleeve cooperates with another sleeve 44 secured to the piston head to provide information on the location of the piston head. Exhaust tubes 46, only one of which can be seen in FIG. 2, allow for the exhaust of cooling air from the space in the upper portion 14 of the housing 2. Spring urged locating pins 48 assist in locating the mechanism in the glass machine.

What is claimed is:

1. A plunger mechanism for use in an I.S. glassware forming machine comprising, a one piece housing comprising a lower portion having a vertical cylindrical bore and an upper portion adapted to receive a plunger guiding and positioning mechanism, a piston head mounted on a piston rod, said piston head being arranged to move axially in sealing engagement with said cylindrical bore and a free end of said piston rod being adapted to support a plunger, a lower sealing member for sealing the lower end of said cylindrical bore, rod guide means extending from said lower sealing member for guiding said rod as it is displaced vertically, an upper sealing member for sealing the upper end of said cylindrical bore and having an aperture through which said piston rod can pass, said upper sealing member selectively configured so that it can be inserted into the one piece housing from the open top and displaced downwardly to a selected location where the lower and upper portions of the housing meet, and fastening means securing said upper sealing member to said one piece housing at the selected location.

2. A plunger mechanism according to claim 1, wherein the one piece housing further comprises shelf means for supporting said upper sealing member when located at the selected location and wherein said fastening means comprises a plurality of screws extending through said upper sealing member into said shelf means.

3. A plunger mechanism according to claim 1, comprising two plungers, the lower portion of the housing comprising two vertical bores and the mechanism comprising two upper sealing members sealing the upper ends of said bores.

\* \* \* \* \*